July 24, 1962  M. J. O'DEA ET AL  3,045,543
SPECTACLES HAVING ATTACHMENT MEANS FOR BROWPIECES
Filed Sept. 1, 1960
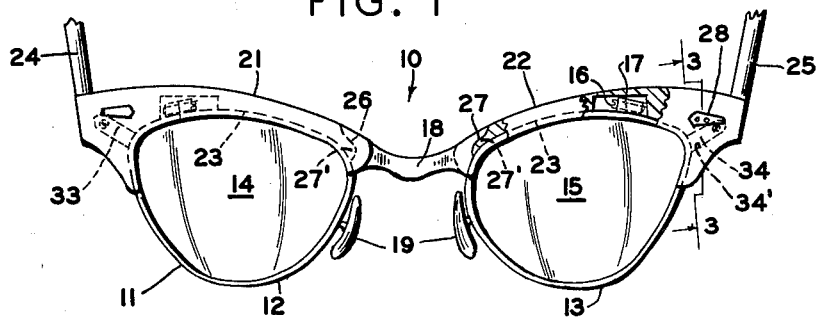
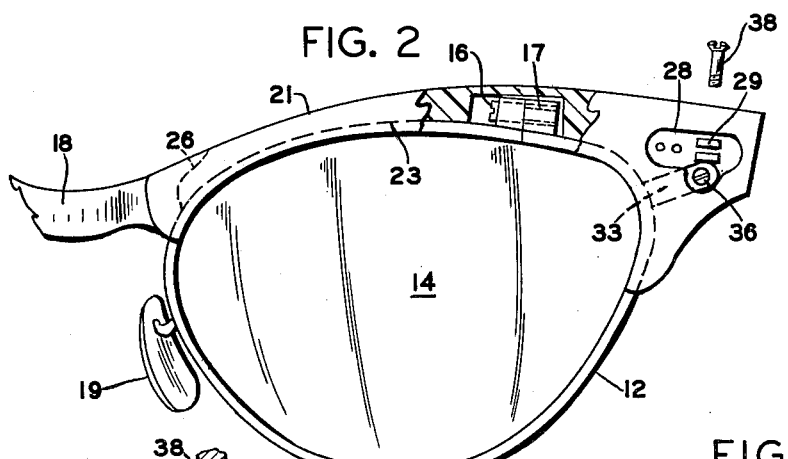
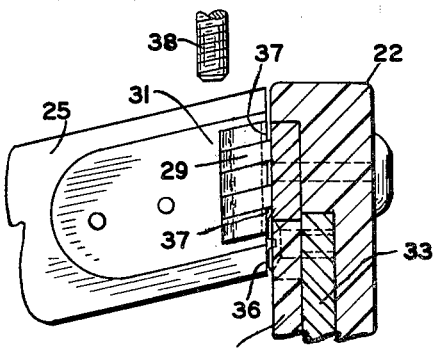
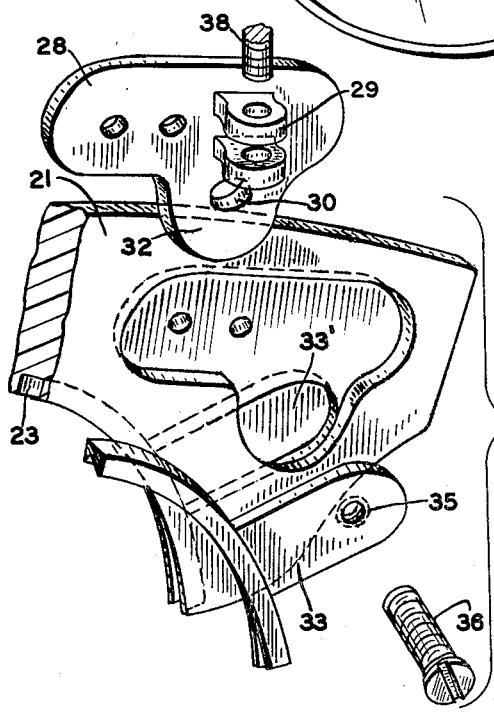
MARTIN J. O'DEA
RAYMOND F. E. STEGEMAN
INVENTORS
BY Frank C. Parker
ATTORNEY

United States Patent Office 3,045,543
Patented July 24, 1962

3,045,543
SPECTACLES HAVING ATTACHMENT MEANS FOR BROWPIECES
Martin J. O'Dea, Rochester, and Raymond F. E. Stegeman, Greece, N.Y., assignors to Bausch & Lomb Incorporated, Rochester, N.Y., a corporation of New York
Filed Sept. 1, 1960, Ser. No. 53,433
2 Claims. (Cl. 88—41)

This invention relates to an ophthalmic mounting for spectacle lenses and more particularly relates to improvements in interchangeable ornamental browpieces therefor.

It is the object of this invention to provide an ophthalmic mounting having novel and improved means for securing demountably an ornamental browpiece to a metallic frame wherein spectacle lenses are held.

It is a further object to provide such a device wherein the parts which secure the browpiece are so constructed that these parts are locked against disengagement as long as the temples are assembled to the frame.

Further objects and advantages will be apparent in the novel details of construction and combination of parts by reference to the specification herebelow taken in connection with the accompanying drawing wherein:

FIG. 1 is a front elevational view of ophthalmic mounting constructed according to a preferred form of our invention;

FIG. 2 is a rear elevational view partly broken away and shown in section at an enlarged scale of the spectacles shown in FIG. 1;

FIG. 3 is a partial sectional view taken on line 3—3 of FIG. 1, the parts thereof being broken away and shown at a further enlarged scale; and FIG. 4 is an exploded perspective view of certain parts of our invention shown greatly enlarged and partly broken away.

As shown in FIG. 1 of the drawing, the ophthalmic mounting or spectacles, generally designated by the numeral 10, comprises a metallic frame 11 having two internally grooved rims 12 and 13 which peripherally enclose a pair of ophthalmic lenses 14 and 15. The rims 12 and 13 are discontinuous and said lenses are clamped therein by suitable screws 16 which unite two parts of terminal lug structure 17 formed on the opposite terminal and separable ends of said rims. A bridge member 18 fixed in any suitable manner such as welding or soldering at its opposite ends to the nasal sides of the rims 12 and 13 serves to connect the rims together and form the aforesaid frame structure 11. Nosepads 19 of any preferred form are suitably fixed to the nasal sides of said rims 12 and 13 for supporting the spectacles on the wearer's nose.

A pair of ornamental browpieces 21 and 22 are provided for demountable attachment to the top portions of the lens rims 12 and 13. Said browpieces extend from the bridge member 18 outwardly in increasing width to enclose the temporal portions of said rims and preferably a groove 23 is formed on the lower side of the browpieces to enclose and conceal the upper parts of the rims. Temples 24 and 25 are carried by the outer ends of said browpiece 21 and 22 respectively as described hereinafter.

Means are provided for detachably securing the nasal ends of said browpieces 21 and 22 to the opposite ends of the bridge member 18 and for ease of assembly said means preferably are constructed as a pair of hooks 26 and 27 formed on said opposite ends of said member. Said hooks 26 and 27 are much narrower than the browpieces 21 and 22 and accommodating slots therefor are formed in the inner ends of the browpieces so as to snugly fit and conceal the hooks. To facilitate the assembly operation, the lower edges of the hooks 26 and 27 are generally inclined or otherwise shaped to form progressively tapered spaces 26' and 27' between said hooks and the adjacent rims 12 and 13, and the ends of the browpieces are shaped to fit into these spaces so as to be retained by the hooks. Short recesses are also formed longitudinally in the under surface of said browpieces for accommodation of the lug structure 17.

Second means are provided for securing the outer ends of the browpieces 21 and 22 to the metallic frame 11 including a temple hinge plate 28 which is fixed in any preferred manner such as riveting to the rear side of the temporal portion of each browpiece and is inset therein substantially the thickness of the hinge plate. On the plate 28, hinge parts 29 are formed which are companion parts to the hinge element 31 (see FIG. 3) formed on the temples 24 and 25.

According to this form of the invention, said second means comprise a broadened portion of plate 28 which is preferably formed into the shape of a tab 32 in the area which lies underneath or below the hinge parts 29. In combination with said tab 32, said second means additionally comprises a pair of sidewardly directed and elongated anchor lugs or arms 33 and 34 which are butt welded or otherwise fixed respectively to the temporal portion of rims 12 and 13 so that the outer ends thereof project under and across said tabs. Accommodating recesses 33' and 34' wherein the lugs 33 and 34 are slidably fitted, are formed in the browpieces 24 and 25 beneath said hinge plates 28. In substantially vertical alignment with said hinge parts 29, a clearance hole 30 is formed through each tab 32 and a threaded hole 35 aligned therewith is formed in each of the lugs 33 and 34 wherein a holding screw 36 is engaged to maintain the browpiece assembled to the frame 11. The browpieces are thus secured demountably to the metallic frame 11 and since the clamping screws 36 therefor are located closely beneath the hinge parts 29, the companion parts 37 of the temple hinges carried on the temples 24 and 25 serve to partially cover said screws when the hinges are assembled to effectively lock said screws thus preventing unthreading or disengaging movement.

The assembly of the mounting 10 is accomplished by inserting the inner ends of the respective browpieces beneath the hooks 26 and 27 and by engaging the upper sides of the rims 12 and 13 into their respective grooves in the browpieces while forcing the temporal portions thereof into seated position. During the later part of this motion, lugs 33 and 34 are pressed into the accommodating recesses 33' and 34' in the browpieces and the screws 36 are inserted into their respective openings 30 and screwed into the lugs 33 and 34. Then the temples 24 and 25 are assembled by the use of the hinge bolts 38 so that the hinges at least partially overlay the clamp screws 36 and effectively lock them in assembled position.

It is submitted that the assembly of the simple mechanism above disclosed is a quick and easy operation but nevertheless reliable and safe in accordance with the objects of this invention.

Although but a single form of our invention has been shown and described in detail, other forms and modifications are possible and changes may be made therein without departing from the spirit of this invention.

What is claimed is:

1. In a spectacle frame having a lens rim and a demountable browpiece overlying and extending around at least the outer temporal portion of said rim and having a temple hinge plate fixed thereto having hinge elements thereon, said means having in combination a screw accommodating area formed contiguous to said elements on said plate in the proximity of the hinge axis, a circular wall defining an opening through said area and located closely adjacent to said elements in a position to be at least partly covered by a demountable part of said hinge, an anchor lug fixed to said temporal portion and extending outwardly across said opening through a recess in said browpiece wherein it is slidably fitted, and a retaining screw extending through said opening and having a threaded engagement with said lug whereby said browpiece is demountably held on said rim and said retaining screw is effectively locked in assembled position by the completion of the hinge assembly.

2. In a spectacle frame having a lens rim and a demountable browpiece overlying and extending around at least the outer temporal portion of said rim and having a temple hinge plate fixed thereto whereon hinge elements are formed for carrying a temple, and separable means for securing said temporal portion of the browpiece demountably on said frame comprising a depending tab which is formed on the lower edge of said plate within the area closely underlying said hinge elements, a circular wall defining an opening through said tab in substantial alignment with the hinge axis, an anchor arm fixed to the temporal portion of said rim and extending outwardly therefrom through a slidably fitted recess in the browpiece in a direction so as to cover said tab, and a holding screw extending through said opening and having a threaded engagement with said arm whereby the demountable part of the hinge overlies said screw and prevents loosening thereof as long as the hinge is completely assembled.

References Cited in the file of this patent

UNITED STATES PATENTS

| | | |
|---|---|---|
| 2,358,734 | Pankhurst | Sept. 19, 1944 |
| 2,748,655 | Rohrbach | June 5, 1956 |